United States Patent [19]

Honma

[11] Patent Number: 5,241,622

[45] Date of Patent: Aug. 31, 1993

[54] SLOT ACCESSING METHOD IN OBJECT-ORIENTED EXPERT SYSTEM

[75] Inventor: Mitsuru Honma, Kawasaki, Japan

[73] Assignee: Fuji Xerox Co., Ltd., Japan

[21] Appl. No.: 743,251

[22] Filed: Aug. 9, 1991

[30] Foreign Application Priority Data

Aug. 20, 1990 [JP] Japan ................................. 2-218737

[51] Int. Cl.⁵ ............................ G06F 7/00; G06F 9/44
[52] U.S. Cl. .................................................... 395/62
[58] Field of Search ......................................... 395/62

[56] References Cited

U.S. PATENT DOCUMENTS 4,967,371 10/1990 Muranaga et al. .................... 395/62
5,133,075 7/1992 Risch .................................... 395/800

OTHER PUBLICATIONS

Kim, "Architectural Issues in Object-Oriented Databases", JOOP, Mar./Apr. 1990, pp. 29-38.
Brownston et al, "Programming Expert Systems in OPS5", Addison-Wesley Publishing Co, 1985, pp. 206-207.
Neuron Data Inc, "Introduction to NEXPERT OBJECT Computing", 1987, p. 10.
Parsaye et al., "Expert Systems for Experts," John Wiley & Sons, 1988, pp. 161-195.
Charniak et al., Artificial Intelligence Programming, second edition, 1987, 276-303.

Primary Examiner—Michael R. Fleming
Assistant Examiner—Robert W. Downs
Attorney, Agent, or Firm—Welsh & Katz, Ltd.

[57] ABSTRACT

A slot accessing method in an object-oriented expert system, wherein data, which is indicative of necessity or non-necessity of re-computation of a slot value and which is created according to a dynamic dependency between a reference slot and a reference slot, is set in a reference slot of an object having a reference rule. When the re-computation is necessary, a flat "T" indicative of the effect is set, whereas when the re-computation is unnecessary, a flat "NIL" indicative of the effect is set. When the value of a slot of an object having a reference slot as its slot value is changed, it is judged whether or not it is necessary to re-compute the slot value of the corresponding reference slot on the basis of data that is indicative of necessity or non-necessity of re-computation of the slot value and that is set in the corresponding reference slot. If the flag "NIL" is set in the corresponding reference slot, then no re-computation is carried out for the slot value.

5 Claims, 18 Drawing Sheets

31a — INSTANCE:TANAKA

| SLOT | SAVING | :($AV1) | 41 |
|---|---|---|---|
| | INCOME | :($AV2) | 42 |
| | EXPEDITURE | :($AV3) | 43 |
| | INSURANCE FEE | :($AV4) | 44 |
| | LIVING EXPENSE: | ($AV5) | 45 |
| | FAMILY:($HOUSEHOLDER) ($SPOUSE) ($CHILD) | | |

31b indicates the SLOT group.

FIG.2

32a — INSTANCE:SPOUSE

| SLOT | NAME | :YOSHIKO TANAKA | |
|---|---|---|---|
| | SEX | :FEMALE | |
| | AGE | :30 | |
| | OCCUPATION | :PART TIMER | |
| | INCOME | :($AV6) | 46 |
| | INSURANCE FEE | :10,000YEN | |

32b indicates the SLOT group.

FIG.3

31a — | INSTANCE:TANAKA |

31b — SLOT:
| SAVING | :($AV1) | — 41 |
| INCOME | :($AV2) | — 42 |
| EXPENDITURE | :($AV3) | — 43 |
| INSURANCE FEE | :($AV4) | — 44 |
| LIVING EXPENSE | :($AV5) | — 45 |
| FAMILY :($HOUSEHOLDER) ($SPOUSE) ($CHILD) | | |
| REFERENCE TABLE: <HASH TABLE> | | — 71 |

FIG. 9

32a — | INSTANCE:SPOUSE |

32b — SLOT:
| NAME | :YOSHIKO TANAKA | |
| SEX | :FEMALE | |
| AGE | :30 | |
| OCCUPATION | :PART TIMER | |
| INCOME | :($AV6) | — 46 |
| INSURANCE FEE | :10,000YEN | |
| REFERENCE TABLE: <HASH TABLE> | | — 72 |

FIG. 10

81 HASH TABLE

| SLOT NAME | REFERENCED ACTIVE VALUE LIST |
|---|---|
| INCOME | (($AV1)) |
| EXPENDITURE | (($AV1)) |
| INSURANCE FEE | (($AV3)) |
| LIVING EXPENSE | (($AV3)) |

FIG.11

82 HASH TABLE

| SLOT NAME | REFERENCED ACTIVE VALUE LIST |
|---|---|
| INCOME | ($AV2) |
|  |  |

1a — INSTANCE:TANAKA

| SLOT | |
|---|---|
| SAVING | :($AV1) |
| INCOME | :($AV2) |
| EXPENDITURE | :($AV3) |
| INSURANCE FEE | :($AV4) |
| LIVING EXPENSE | :250,000YEN |
| FAMILY | :($HOUSEHOLDER)($SPOUSE)($CHILD) |

1b

2a — INSTANCE:HOUSEHOLDER

| SLOT | |
|---|---|
| NAME | :KAZUYUKI TANAKA |
| SEX | :MALE |
| AGE | :32 |
| OCCUPATION | :COMANY EMPLOYEE |
| INCOME | :300,000YEN |
| INSURANCE FEE | :30,000YEN |

2b

3a — INSTANCE:SPOUSE

| SLOT | |
|---|---|
| NAME | :YOSHIKO TANAKA |
| SEX | :FEMALE |
| AGE | :30 |
| OCCUPATION | :PART TIMER |
| INCOME | :80,000YEN |
| INSURANCE FEE | :10,000YEN |

3b

4a — INSTANCE:CHILD

| SLOT | |
|---|---|
| NAME | :YOSHIO TANAKA |
| SEX | :MALE |
| AGE | :3 |
| OCCUPATION | :NONE |
| INCOME | :0 |
| INSURANCE FEE | :10,000YEN |

4b

| REFERENCE RULE NAME | RULE |
|---|---|
| REFERENCE RULE 1 | DIFFERENCE BETWEEN SLOT INCOME OF CLASS HOUSEHOLD AND SLOT EXPENDITURE OF CLASS HOUSEHOLD |
| REFERENCE RULE 2 | TOTAL OF SLOT INCOMES OF ALL INSTANCES HAVING SLOT FAMILY OF CLASS HOUSEHOLD |
| REFERENCE RULE 3 | SUM OF SLOT LIVING EXPENSE OF CLASS HOUSEHOLD AND SLOT INSURANCE FEE OF CLASS HOUSEHOLD |
| REFERENCE RULE 4 | TOTAL OF SLOT INSURANCE FEE OF ALL INSTANSES HAVING SLOT FAMILY OF CLASS HOUSEHOLD |

FIG. 21

SLOT ACCESSING METHOD IN OBJECT-ORIENTED EXPERT SYSTEM

BACKGROUND OF THE INVENTION

1. Field of the Invention

The present invention relates to a slot accessing method in an object-oriented expert system, wherein a plurality of rules on predetermined knowledge are carried out for inference.

2. Description of the Related Art

There has been recently realized an object-oriented expert system which has a knowledge base having a plurality of rules on predetermined knowledge stored therein and class structure of modeled problem objects and wherein the stored rules are carried out for inference.

In an object-oriented language, the concept of class and instance is used to modelize a problem object. In the class, a plurality of slots (attributes) can be defined, and as values of the slots, objects such as character strings, numerals, lists, classes and instances are given. As means for easily realizing the side effect of slot access (value reference and assignment), there is such an active value mechanism. In this mechanism, in accessing a slot having an instance of a class "active value" as its slot value, a reference function of an active value is activated when referencing to the slot value and an assignment function of the active value is activated when assigning the slot value. The "active value" refers to a value which causes the side effect when the slot is accessed.

The slot accessing operation based on the active value mechanism will be briefly explained by reflecting to FIGS. 19 to 21.

Referring first to FIG. 19, there is shown an example of instances belonging to a class "household", in which instances 1a to 4a have corresponding slots 1b to 4, respectively.

Shown in FIG. 20 is an example of instances belonging to a class "active value", in which instances 5a to 8a have corresponding slots 5b to 8b, respectively.

In more detail, the instance 1a (instance "Tanaka") in FIG. 19 has slots "saving", "income", "expenditure", "insurance fee", etc., which are associated with the instances 5a, . . . 8a in FIG. 20, respectively.

FIG. 21 shows an example of hierarchical reference rules, in which case reference rules 1 to 4 are set having different rule contents.

Turning again to FIG. 19, at the time of referring to one "saving" of the slots 1b of the "Tanaka" instance 1a, the reference rule 1 corresponding to the reference function of the instance 5a (instance AV1) of the class "active value" in FIG. 20 is invoked. When the reference rule 1 is executed, the reference rule 2 for the reference function of the instance 6a (instance AV2) and the reference rule 3 for the reference function of the instance 7a (instance AV3) are invoked and executed according to the corresponding reference rules of FIG. 21. Similarly, when the reference rule 3 of the instance 7a (instance AV3) is executed, the reference rule 4 for the reference function of the instance 8a (instance AV4) is invoked and executed according to the corresponding reference rule of FIG. 21.

Through the hierarchical reference rules invoked and executed in this way, the slot "saving" in the slots 1b of the "Tanaka" instance 1a can be found.

In such a prior art object-oriented expert system as mentioned above, however, when the active value is applied to the slot having such hierarchical reference rules as the reference rules 1 to 4 shown in FIG. 21, all the four reference rules 1 to 4 are always invoked. In this way, the prior art expert system has been defective in that the application of the active value to the slot having such hierarchical reference rules causes unnecessary repetitive computation of slot values, which results in that the reference to the slot value requires a lot of processing time.

SUMMARY OF THE INVENTION

It is therefore an object of the present invention to provide a slot access method in an object-oriented expert system which enables quick accessing to a slot.

Another object of the present invention is to provide a slot access method in an object-oriented expert system which can quickly refer to a slot value.

In order to attain the above objects, the present invention is arranged to judge, at the time of referencing to a slot value of a reference slot of an object having a reference rule, whether or not it is necessary to re-compute the slot value of the reference slot on the basis of a dynamic dependency relationship between the reference slot and a referenced slot.

In accordance with the present invention, data, which is indicative of whether the slot value is to be re-computed or not and which is created according to the dynamic depending between the referenced slot and reference slot, is held in the slot of the object having the reference rule. During the referencing operation of the slot value of the slot of the object having the reference rule, the above data held in the slot is referenced to so that, when a referenced result indicates that no re-computation is required, the slot value is not re-computed. Accordingly, since it is sometimes unnecessary to re-compute the slot value of the slot of the object having the reference rule, slot accessing speed can be made fast.

Other objects and effects of the present invention will be made clear from the detailed explanation of the invention and the attached drawings.

BRIEF DESCRIPTION OF THE DRAWINGS

FIGS. 2 and 3 show contents of some of instances of a "household" class used in the first embodiment;

FIGS. 9 and 10 are contents of some of instances of a "household" class used in a slot accessing method in an object-oriented expert system in accordance with a second embodiment of the present invention;

FIGS. 11 and 12 show examples of a hash table used in the second embodiment of FIG. 12;

FIG. 19 shows contents of the instances of a "household" class used in a prior art slot accessing method;

FIG. 21 shows hierarchical reference rules.

DESCRIPTION OF THE PREFERRED EMBODIMENTS

Embodiments of the present invention will be detailed with reference to the accompanying drawings.

A first embodiment of the present invention will be explained by referring to FIGS. 1 to 8.

Figure 1:
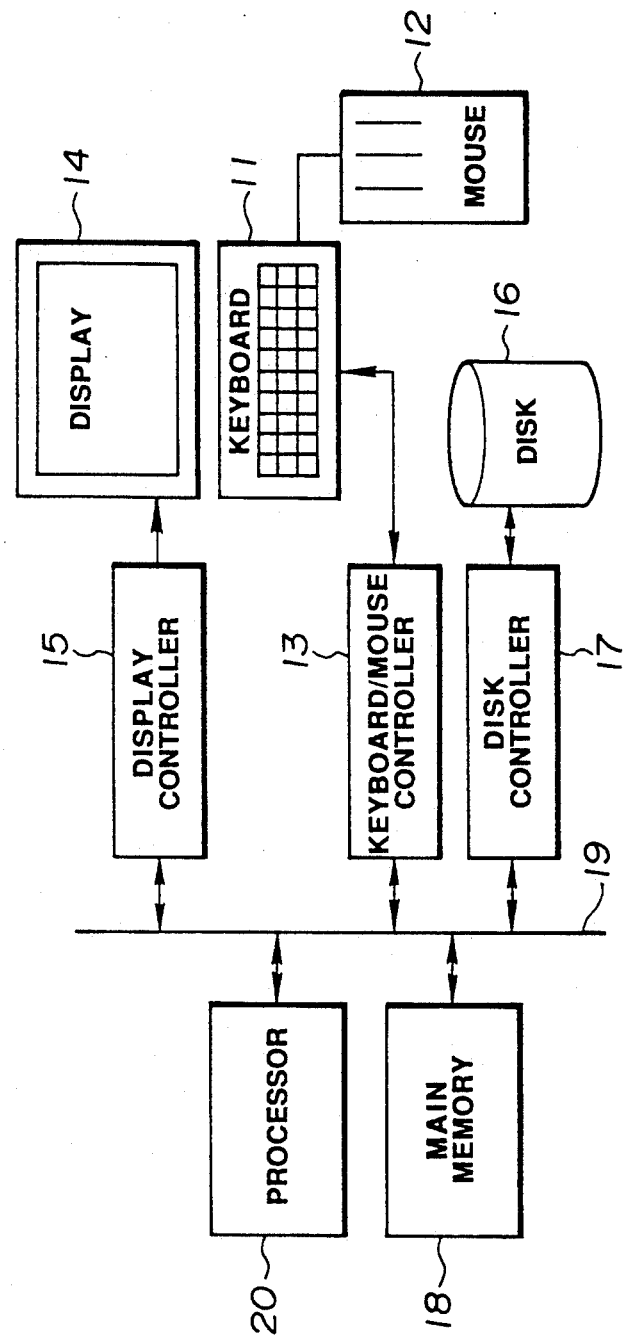
FIG. 1 is a block diagram of an arrangement of a system embodying a slot accessing method in an object-oriented expert system in accordance with a first embodiment of the present invention.

Referring first to FIG. 1, there is shown a block diagram of an arrangement of an object-oriented expert system embodying the first embodiment of a slot access method in accordance with the present invention. In the illustrated example, the embodiment of the invention is applied to, for example, a workstation.

In FIG. 1, the illustrated workstation includes a keyboard 11 through which an operator enters data and commands, a mouse 12 for menu selection, a keyboard/mouse controller 13 for performing input/output control over the instructions and data entered through the keyboard 11 and mouse 12, a display 14, a display controller 15 for controlling the display 14 to cause such windows as a slot value and inferred result to be displayed on the display 14, a disk 16 for storing therein class and instance data as well as knowledge bases, a disk controller 17 for controlling data input/output over the disk 16, a main memory 18 for storing therein instructions and data entered through the keyboard 11, the mouse 12 and an operating system, and a processor 20 connected to a bus 19 for controlling the respective controllers and main memory 18 connected to the bus 19 to carry out execution of slot reference rules for inference.

Figure 4:
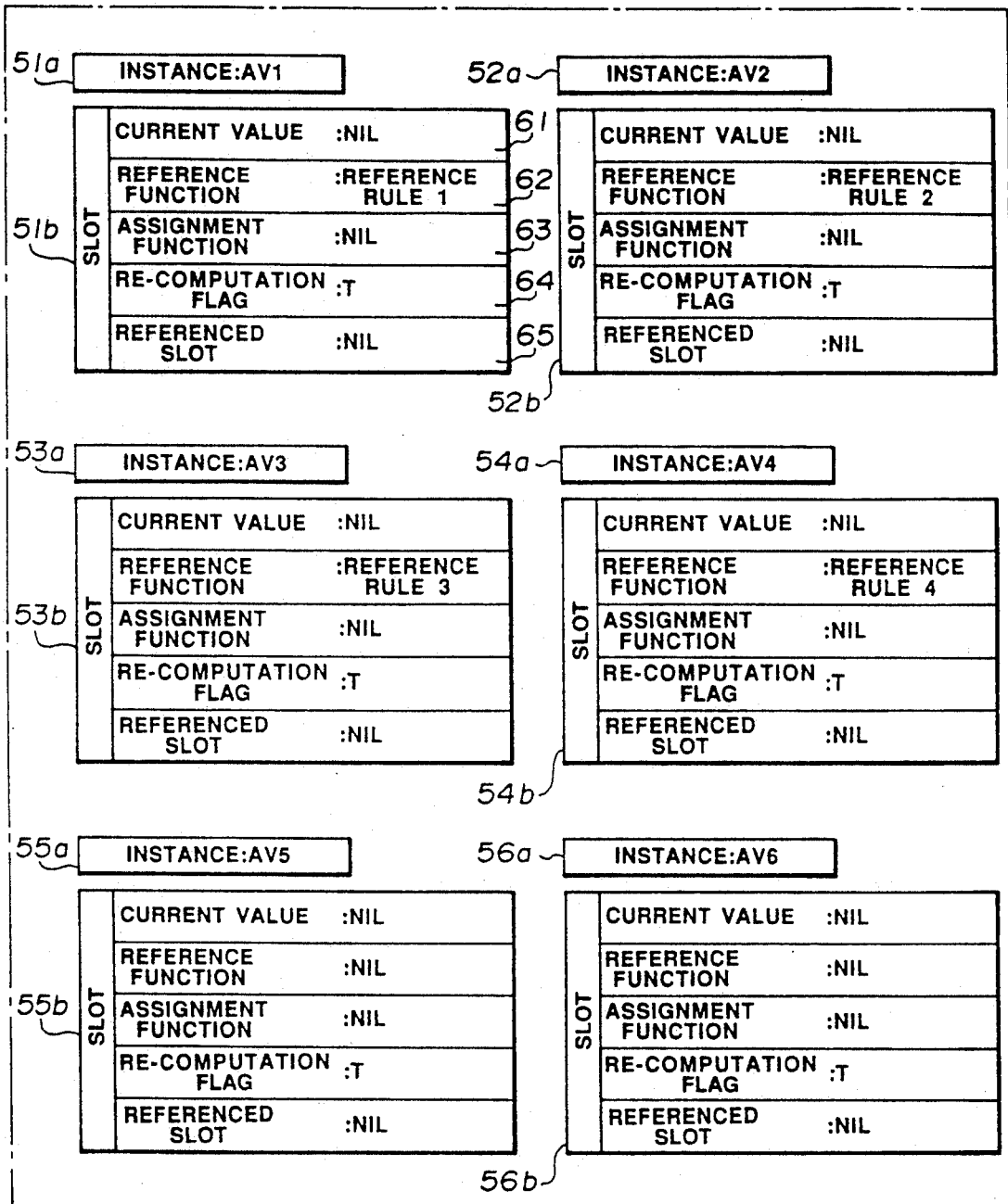
FIGS. 4 to 6 show contents of instances of an "active value" class used in the first embodiment.

Stored in the above disk 16 are such class data as a "household" class and a "active value" class, such instance data as an instance 31a (instance "Tanka") of FIG. 2 and an instance 32a (instance "spouse") of FIG. 3 and instances 51a to 56a belonging to the class "active value" of FIG. 4, and such hierarchical reference rules as shown in FIG. 21 as a knowledge base.

More specifically, the instance 31a of FIG. 2 has a slot 31b which in turn has slots 41 and 45 associated with each other. The values of the slots 41 to 45 are given on the basis of the instances 51a to 55a (instances AV1 to AV5) belonging to the "active value" class. The instance 32a of the FIG. 3 has a slot 32b which in turn has a plurality of slots including a slot 46. The value of the slot 46 in the slot 32b is given based on the instance 56a (instance AV6) belonging to the "active value" class.

Figure 20:
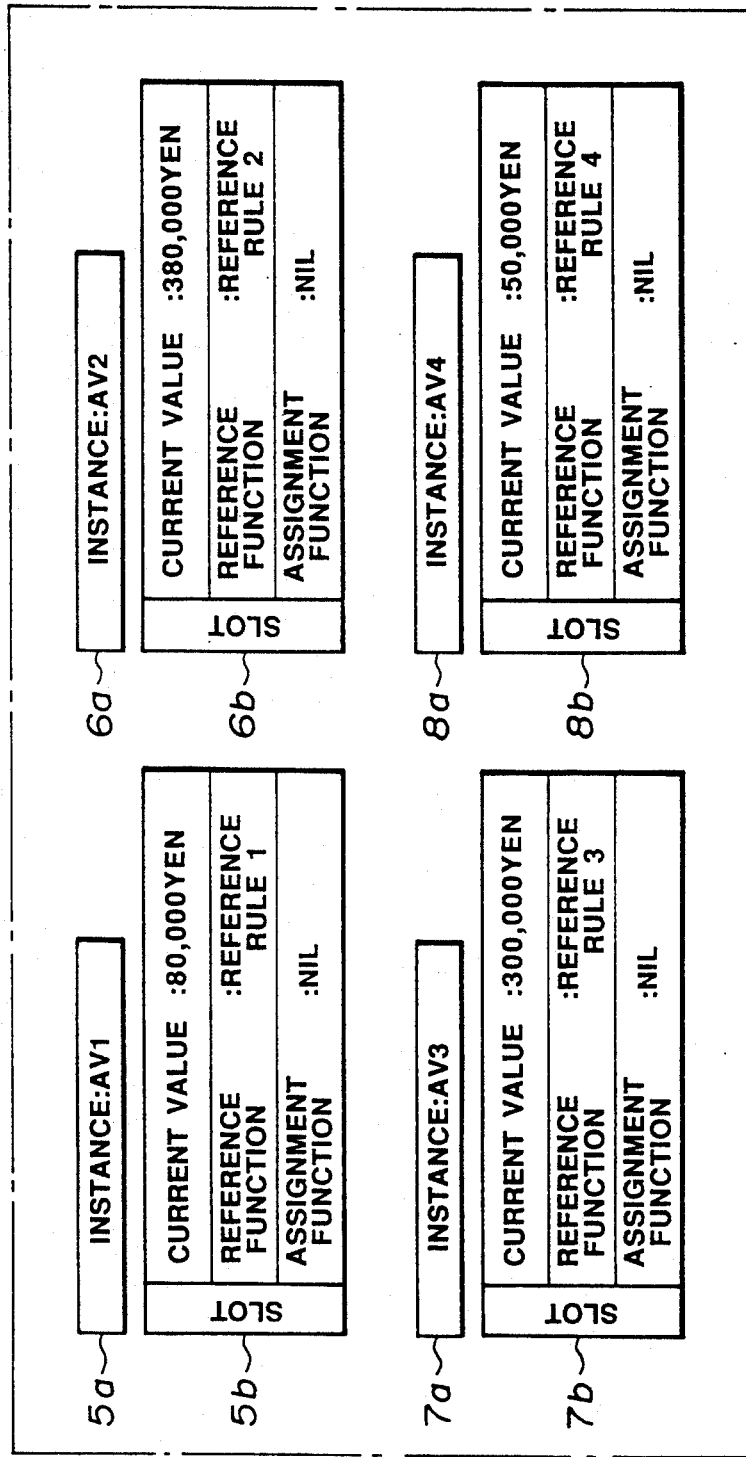
FIG. 20 shows contents of the instances of an "active value" class used in the prior art slot accessing method.

With such instance configuration of the "active value" class as shown in FIG. 4, the instances 51a to 56b (instances AV1 to AV6) have slots 51b to 56b set therein, respectively. Each of the slots 51b to 56b has such slots 61 to 65 as shown in the slot 51b. The structure of each of the instances of FIG. 4 corresponds to the structure of each of the instances of FIG. 20 but newly added by the slot 64 (instance "re-computation flag") and the slot 65 (instance "referenced slot"). The illustrated slots of the instances of FIG. 4 have their initial values (mean that the slots are not referenced yet).

More specifically, the "re-computation flag" slot 64 stores therein data indicative of whether or not to again compute the value of the reference slot when the slot value of the "referenced slot" is changed. Stored in the "re-computation flag" slot 64 is a flag "T" when re-computation is carried out (when the reference function is activated and executed) while a flag "NIL" when no re-computation is carried out (when the reference function is not activated).

Meanwhile, the "referenced slot" slot 65 stores therein a data indicative of a dynamic dependency relationship (to be detailed later) between the referenced slot and the reference slot. The data may be a slot specifier which is made up of an instance name and slot name. Stored in the "referenced slot" slot 65 of an instance being referenced (instance to which the reference slot belongs) is the slot specifier of the referenced slot when reference is made to by the reference slot while "NIL" when no reference is made. Further, it is possible for a plurality of referenced slots to refer to the same reference slot, in which case the slot specifiers of the plurality of referenced slots are stored in the "referenced slot" slot 65.

In the present embodiment, the referenced (reference originator) slots refer to the slots having the instances of the class "active value" as slot values (that is, the slots in the instances of the class "household"; whereas the reference (reference destination) slots refer to slots in the instances of the class "active value".

The dynamic dependency between the referenced and reference slots is determined based on the reference rules of FIG. 21. The following is the dependency, for example, between the slots of the "saving", "income" and "expenditure" slots 41, 42 and 43 of the "Tanka" instance 31a and their reference slots as reference destinations.

When the "saving" slot 41 of the "Tanka" instance 31a is referenced, the "saving" slot 41 is a referenced (reference originator) slot, whereas the slots of the instance 52a (instance AV2) and the slots of the instance 53a (instance AV3) in FIG. 4 are reference slots based on the reference rule 1 (refer to FIG. 21).

When reference is made to the "income" slot 42 of the "Tanka" instance 31a, the "income" slot 42 is a referenced (reference originator) slot, while the slots of the instance 56a (instance AV6) in FIG. 4 are reference slots based on the reference rule 2 (refer to FIG. 21).

Further, when reference is made to the "expenditure" slot 43 of the "Tanka" instance 31a, the "expenditure" slot 43 is an referenced (reference originator) slot, whereas the slots of the instance 52a (instance AV2) and the slots of the instance 53a (instance AV3) in FIG. 4 are reference slots based on the reference rule 3 (refer to FIG. 21).

With the aforementioned arrangement, explanation will be made as to the slot accessing operation of the processor 20.

Figure 5:
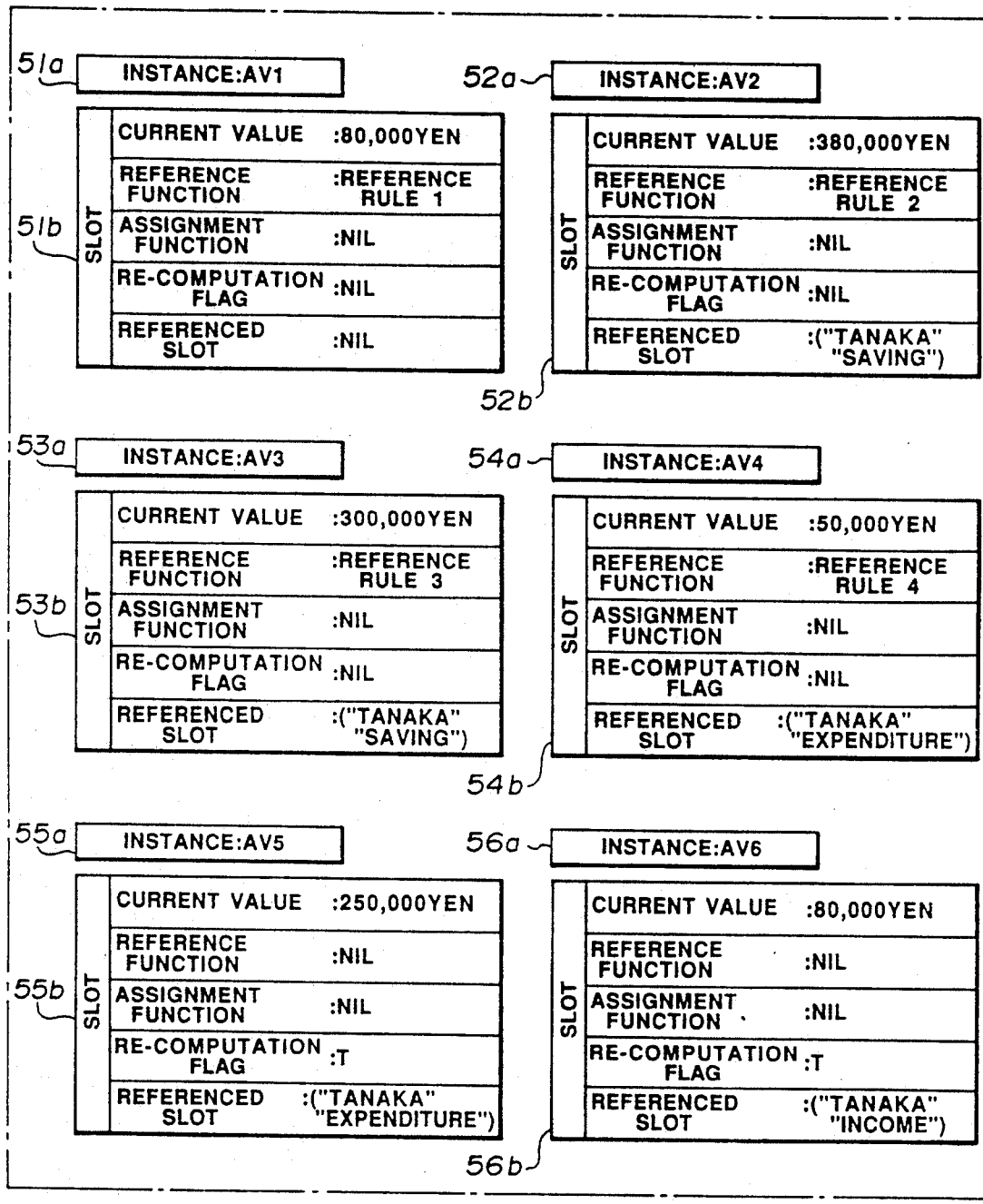
Figure 6:
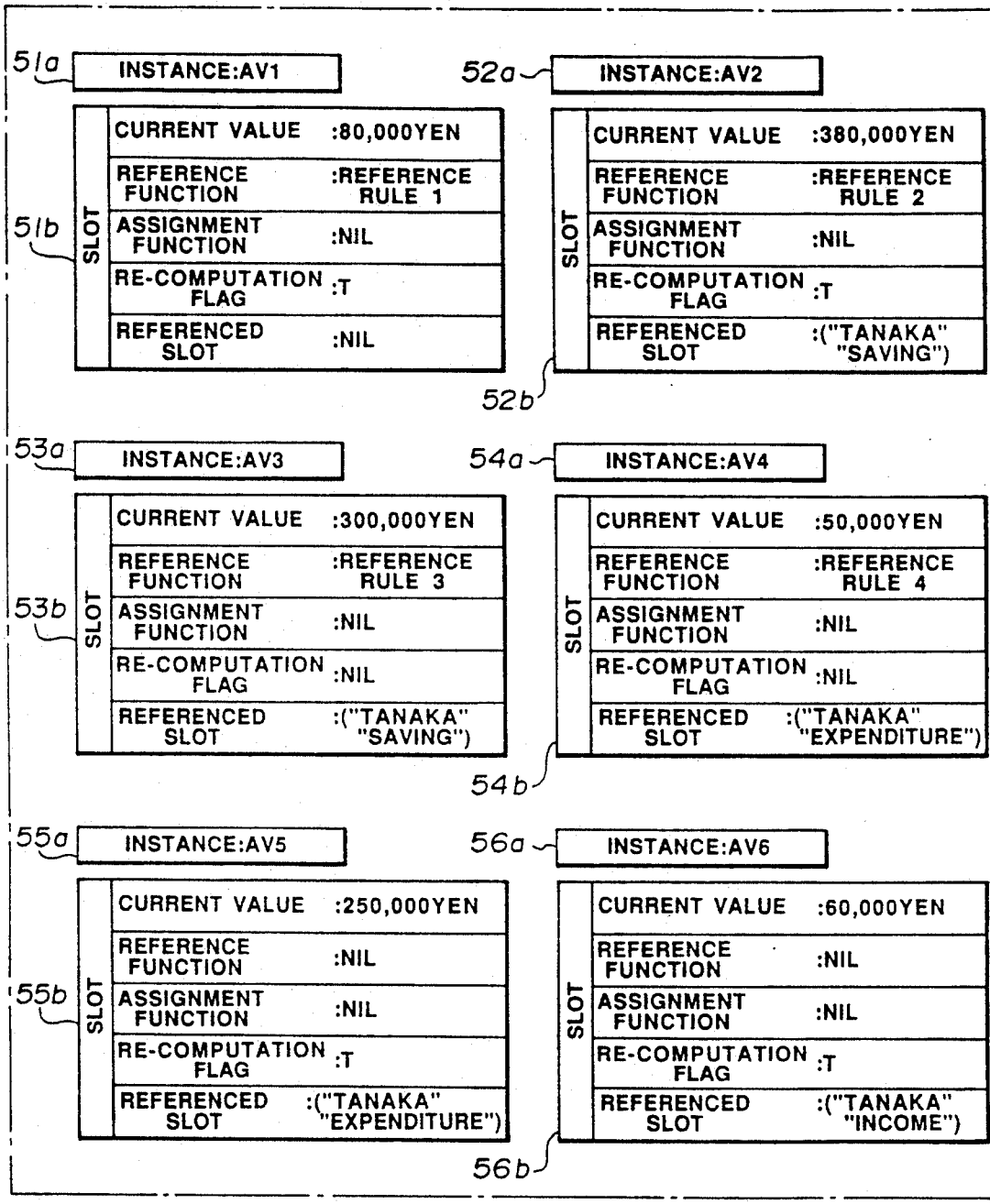
Figure 7:
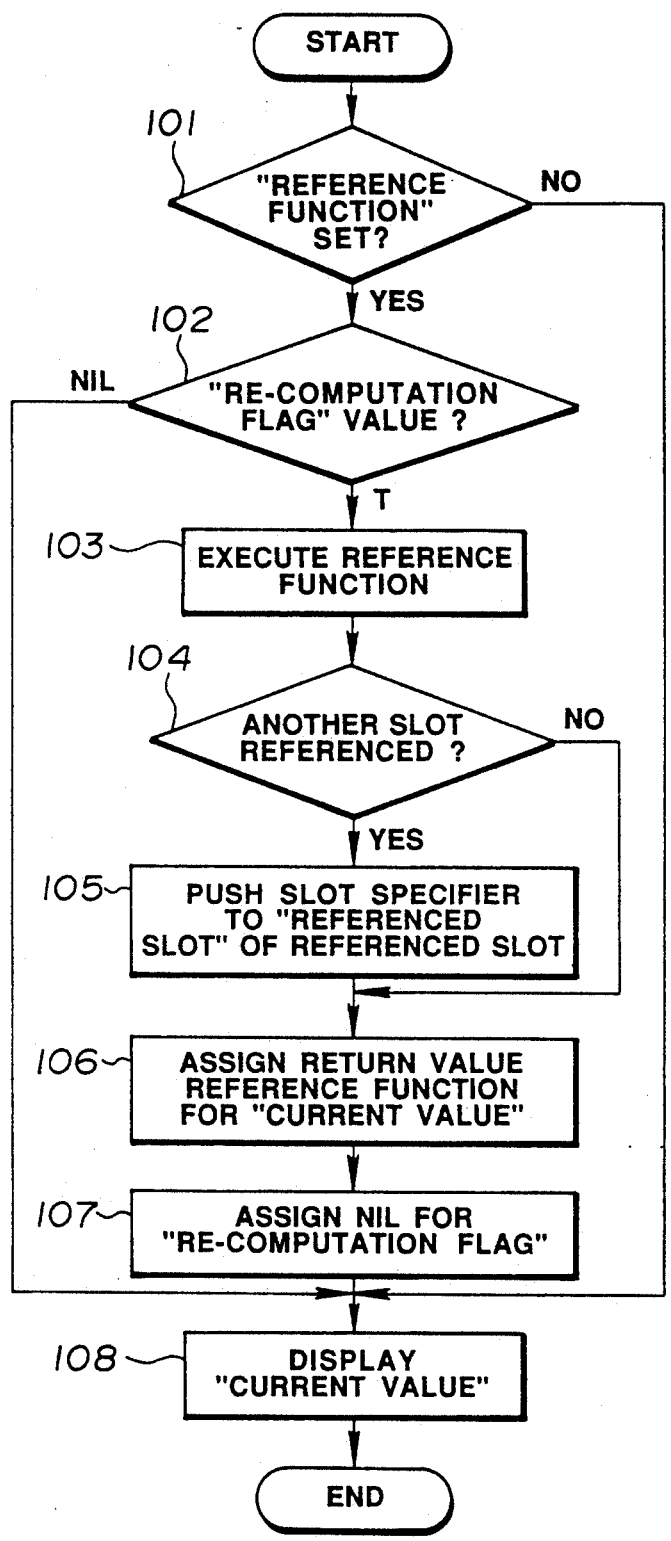
FIG. 7 is a flowchart for explaining the referencing operation of a slot value in the first embodiment.
Figure 8A:
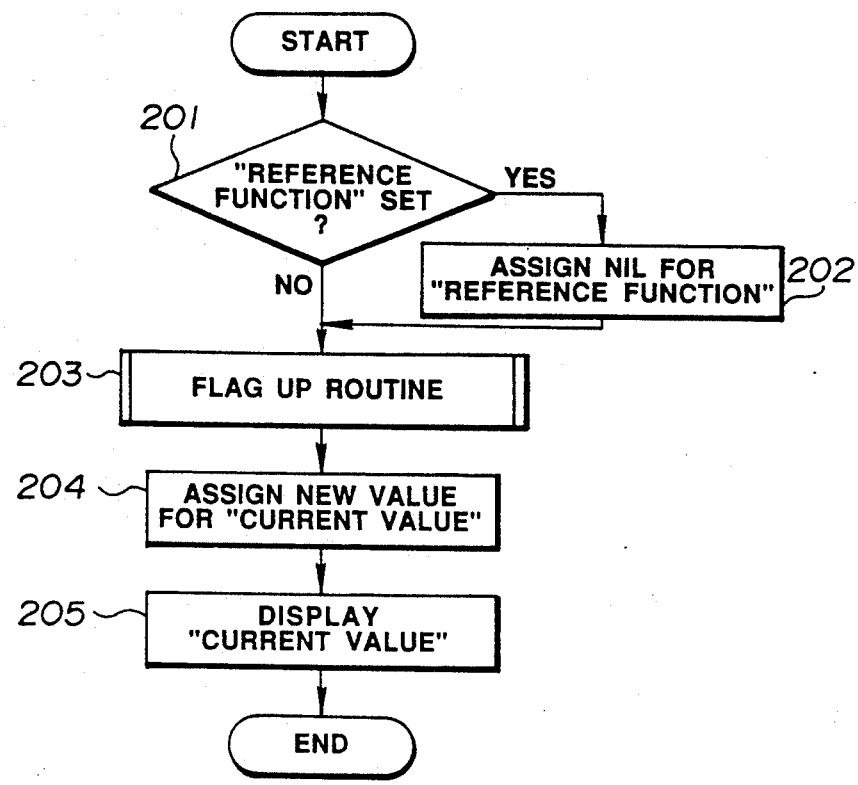
FIGS. 8(a) and 8(b) are a flow chart for explaining the assigning operation of a slot value in the first embodiment.
Figure 8B:
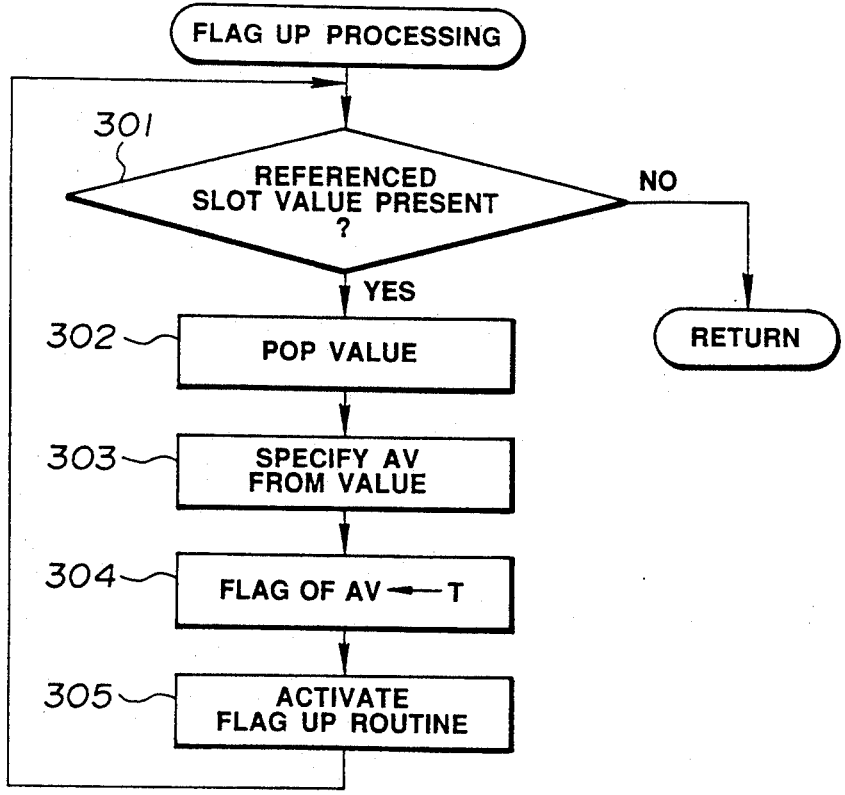

FIGS. 5 and 6 show the details of the slots of the instances belonging to the "active value" class for explaining the referencing operation of the slot value. FIG. 7 is a flowchart for explaining the referencing operation of the slot value at the referencing time, FIG. 8(a) is a main routine showing the assigning operation of the slot value at the time of assignment, and FIG. 8(b) is a sub-routine showing the assigning operation.

As shown in FIG. 7, the processor 20 examines whether or not the reference function (reference rule) is set in the "reference function" slot in an instance to be referenced (step 101) and when determining that the reference function is set, further examines whether the "re-computation flag" slot has a value of "T" or "NIL" (step 102). When the slot has a value of "T", the processor 20 executes the reference function set in the "reference function" slot (step 103) and thereafter checks whether or not reference was made to a slot of another instance (step 104). If the reference was made, then the processor 20 pushes the slot specifier of the referenced slot for the "referenced slot" slot of the reference slot (STEP 105).

When the processor 20 completes the step 105 or when the reference to the other slot is not made, the processor 20 assigns the return value of the reference function set in the "reference function" slot of the instance to be referenced for a "current value" slot (step 106), assigns "NIL" for the "re-computation flag" slot (step 107) and then displays the value of the "current value" slot (step 108).

When the reference function is not set in the above step 101 or when the "re-computation flag" slot has a value of "NIL", the processor 20 proceeds to the step 108.

Explanation will next be made as to how the processor 20 performs its assigning operation of the slot value in the assignment mode. As shown in FIG. 8(a), the processor 20 first checks whether or not the reference function (reference rule) is set in the "reference function" slot of an instance to be assigned (step 201). If determining that the reference function is set, then the processor 20 assigns "NIL" for the "reference function" slot (step 202). When the step 202 is completed or when the reference function is determined not to be set in the step 201, a "flat up" routine is invoked to be executed (step 203).

When the "flag up" routine is invoked, the processor 20, as shown in FIG. 8(b), examines whether or not the "referenced slot" slot has a value (step 301) and if determining that the slot has a value, then pops the value (step 302). Next, the processor 20 specifies one of the instances belonging to the "active value (AV)" class on the basis of the popped value (step 303) and assigns "T" for the "re-computation flag" slot of the specified instance (step 304). The processor 20 then starts the "flag up" routine and returns to the step 301 to execute the processing of the steps 301 to 304 (step 305) for the specified instance.

When the "referenced slot" slot has no value in the step 301, the processor 20 returns to the main routine. Then, the processor 20, as shown in FIG. 8(a), assigns a new value for the "current value" slot (step 204) and displays the value (step 205).

Next, the detailed referencing operation of the slot 41 ("saving" slot) of the "Tanaka" instance 31a at the time of the first referencing operation will be explained by referring again to FIG. 7. In this case, the instances of the "active value" class have such slot values as shown in FIG. 4. That is, the "re-computation flag" slots of the instances 51a to 56a (instances AV1 to AV6) have all "T" set therein and the "reference function" slots of the instances 51a to 54a (instances AV1 to AV4) have different reference rules set therein, respectively.

Thus, when the first reference is made to the "saving" slot 41 (referenced slot) of the "Tanaka" instance 31a to be referenced (refer to FIG. 2), the "re-computation flag" slot has a value of "T", whereby the reference rule 1 is invoked as the reference function of the instance 51a (instance AV1). Further, reference is made according to the reference rule 1 to the instance 52a (instance AV2) and the instance 53a (instance AV3). At this time, sine the "re-computation flag" slots of these instances 52a and 53a have respectively a value of "T", the reference rules 2 and 3 corresponding to the reference functions of the instances 52a and 53a (instances AV2 and AV3) are invoked (refer to FIG. 4). Reference is further made to the instance AV4 according to the reference rule 3. At this time, since the "re-computation flag" slot of the instance AV4 has a value of "T", the reference rule 4 corresponding to the reference function of the instance AV4 is invoked (refer to FIG. 4 and also to the steps 101 to 103 in FIG. 7).

During the execution of the reference rule 1, since the instance 51a (instance AV1) references the instances 52a and 53a (instances AV2 and AV3), the specifier ("Tanka", "Saving") of the reference slot is pushed for the "referenced slot" slots of these instances.

Similarly, during the execution of the reference rule 2, the slot specifier ("Tanka", "Income") of the reference slot is pushed for the "referenced slot" slot of the instance 56a (instance AV6) . During the execution of the reference rule 3, the slot specifier "Tanka" "Expenditure" of the referenced slot is pushed for the "referenced slot" slots of the instance 54a and 55a (instances AV4 and AV5). During the execution of the reference rule 4, as not illustrated in FIG. 4, since reference is made to the "insurance fee" slots of all instances belonging to the "household" class, the slot specifier ("Tanka", "Insurance fee") of the referenced slot is pushed for the "referenced slot" slots of these instances (refer to the steps 104 to 107 in FIG. 7).

When reference is made to the instances of the "active value" class in this way and the reference rules 1 to 4 are invoked and executed, the contents of the instances of the "active value" class shown in FIG. 4 are changed to those shown in FIG. 5.

Explanation will next be made as to the assigning operation when it is desired to change the "income" slot 46 of the "spouse" instance 32a of FIG. 3 from '80,000Yen' to '60,000Yen' under a condition that the instances of the "active value" class have such slot values as shown in FIG. 5, by referring again to FIGS. 8(a) and 8(b ).

In this case, the instance 56a (instance AV6) in FIG. 5 is first invoked. Since no reference function is set in the "reference function" slot of the instance 56a (instance AV6) as shown in FIG. 5, the "flap up" routine is invoked and executed (refer to the step 201 and 203 in FIG. 8(a). In the "flag up" operation, since the "referenced slot" slot of the instance 56a (instance AV6) has a value of ("Tanka", "Income") (i.e., since the instance 52a (instance AV2) is present), the value ("Tanka", "Income") is popped and the instance 52a (instance AV2) is specified from the popped value ("Tanka", "Income"). Further, a value "T" is assigned for the "re-computation flag" slot of the specified instance 52a (instance AV2) (refer to the steps 301 to 304 in FIG. 8(b)). Thereafter, the "flag up" routine is activated to execute the steps 301 to 304 and then the step 305 even for the instance 52a (instance AV2) (refer to the step 305 in FIG. 8(b)).

In the "flag up" operation of the instance 52a (instance AV2), since a value "Tanka", "Saving" is set in the "referenced slot" slot as shown in FIG. 5, the value ("Tanaka", "Saving") is popped and the instance 51a (instance AV1) is specified by the popped value. Further, a value "T" is assigned for the "re-computation flag" slot of the specified instance 51a (instance AV1) and then the "flag up" routine is activated (refer to the steps 301 to 305 in FIG. 8(b)).

During "flag up" operation of the instance 51a (instance AV1), the value "NIL" is set in the "referenced slot" slot, so that the processor 20 returns to the main routine. This causes a new value "60,000Yen" to be assigned for the "current value" slot of the instance 56a (instance AV6) and to be displayed (refer to the steps 204 and 205 in FIG. 8(a)).

Shown in FIG. 6 is the contents of the instances of the "active value" class of FIG. 5 after a value is assigned for the "income" slot 46 of the "spouse" instance 32a of FIG. 3.

Explanation will next be made as to the referencing operation when reference is made again to the "saving" slot 41 of the "Tanaka" instance 31a of FIG. 2 under a condition that the instances of the "active value" class have such slot values as shown in FIG. 6, by referring again to FIG. 7.

In this case, reference is first made to the instance 51a (instance AV1) in FIG. 6. As shown in FIG. 6, since the reference rule 1 is set in the "reference function" slot of the instance 51a (instance AV1) and the value "T" is set in the "re-computation flag" slot, the reference function (reference rule 1) is invoked and executed (refer to the steps 101 to 103 in FIG. 7).

When the reference rule 1 is activated, this causes the instances 52a and 53a (instances AV2 and AV3) to be referenced. At this time, the instances 52a and 53a (instances AV2 and AV3) are also subjected to the execution of the steps 101 to 108 of FIG. 7.

During the referencing operation of the instance 52a instance AV2), the "re-computation flag" slot has a value of "T", which results in that the reference rule 2 as the reference function is invoked and executed so that the "current value" slot has a value of "360,000Yen" is returned as the return value of the reference function to the "saving" slot 41 of the "Tanaka" instance 31a.

During the referencing operation of the instance 53a (instance AV3), on the other hand, the "re-computation flag" slot has a value of "NIL", which results in that no re-computation is carried out for the slot value and the value "300,000Yen" of the "current value" slot is returned to the "saving" slot 41 of the "Tanaka" instance 31a.

When the execution of the reference function is completed, the return value of the reference function (reference rule 1) (i.e., saving=income minus expenditure=360,000Yen=300,000Yen=60,000Yen) is assigned for the "current value" slot of the instance 51a (instance AV1) and a value "NIL" is assigned for the "re-computation flag" slot and thereafter the value "60,000Yen" of the "current value" slot is displayed (refer to the steps 106 to 108 in FIG. 7).

As has been explained above, even when the reference rule 1 of the instance 51a (instance AV1) is invoked and executed, the value "60,000Yen" of the "current value" slot of the instance 51a (instance AV1) can be found without again computing the "current value" slot of the instance 53a (instance AV3) only by again computing the value "360,000Yen" of the "current value" slot of the instance 52a (instance AV2). After the completion of execution of the reference rule (after the step 103), substantially the same processing operation (steps 104 to 108) as the initial referencing operation of the "saving" slot is carried out.

As has been explained in the foregoing, in accordance with the first embodiment of the present invention, such slots as the "re-computation flag" and "referenced slot" slots are added to the object (class) slots having reference rules and judgement is made whether or not to perform the re-computation of the slot value of the object slot having reference rules, so that, only when a data (e.g., "T") indicative of the re-computation is set in the "re-computation flag" slot, the slot value is again computed. As a result, the referencing operation to the slot value can be made fast, that is, access to the slot can be made fast.

Explanation will then be made as to a second embodiment of the present invention with reference to FIGS. 9 to 18. The system embodying the slot accessing method in accordance with the present invention is realized with use of a workstation which has substantially the same arrangement as that of the workstation of FIG. 1. In this case, the disk 16 in FIG. 1 stores therein basically the same data as those already explained in conjunction with the first embodiment. More concretely, the data stored in the disk 16 explained in the first embodiment are used as partly modified in the second embodiment and thus only the modified data will be explained in the following.

That is, the structure of the instance of FIG. 2 is changed to that of the instance of FIG. 9 while the structure of the instance of FIG. 3 is changed to that of the instance of FIG. 10, respectively.

The instances of FIGS. 9 and 10 correspond to the instances of FIGS. 2 and 3 but newly added by "reference table" slots 71 and 72 respectively. Registered in the slots 71 and 72 are data which respectively indicate a dynamic dependency between referenced slots and reference slots and which are used at the time of assigning the slot value, for example, a data "hash table" indicative of a hash table.

FIG. 11 is an exemplary hash table 81 corresponding to value of the "hash table" of the "reference table" slot 71, whereas FIG. 12 is an exemplary hash table 82 corresponding to a value of the "hash table" of the "reference table" slot 72. These hash tables are used when it is desired to create a data ("NIL" or "T") indicative of whether or not to re-compute the slot value of the "re-computation flag" slot based on the dependency between the referenced and reference slots in the slot-value assignment mode.

Figure 13:
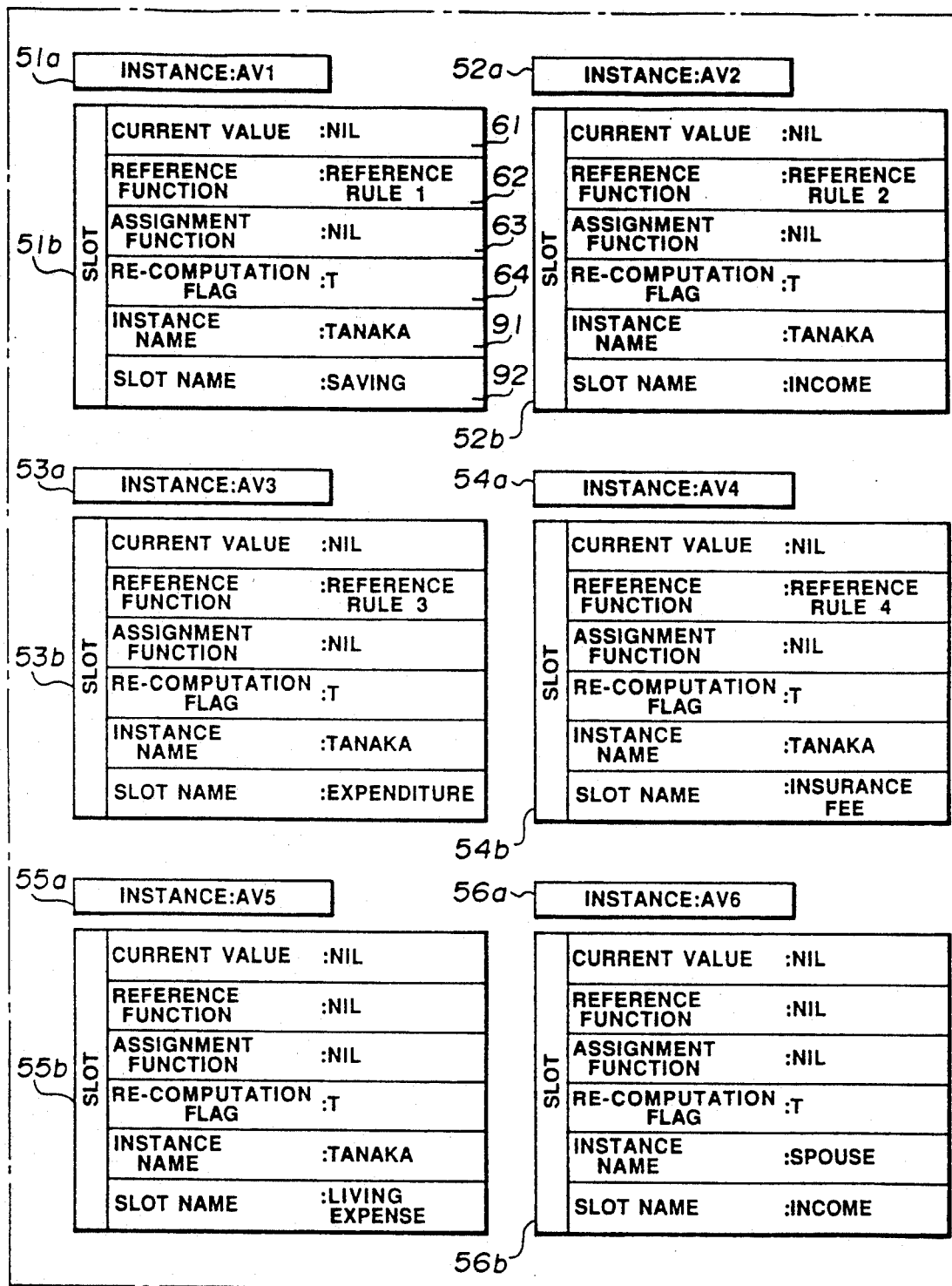
FIGS. 13 to 16 show contents of instances of an "active value" class used in the second embodiment.

In addition, the contents of the instances of the "active value" class of FIG. 4 are modified to those of FIG. 13. More specifically, each of the instances of FIG. 13 corresponds to each of the instances of FIG. 4 but with the "referenced slot" slot 65 deleted and newly added by "instance name" and "slot name" slots 91 and 92. The slots of the instances of FIG. 13 have their initial values (in conditions not referenced yet).

In FIG. 13, stored in the "re-computation flag" slot of each instance is a data indicative of whether or not to re-compute the slot value of the reference slot when the slot value of the referenced slot is changed or a data for invalidating the reference rule when a value is assigned for a slot of an object having the reference rule. Further stored in the "re-computation flag" slot is a flag "T" when re-computation is carried out (when the reference function is activated and executed), a flag "NIL" when no re-computation is carried out (when the reference function is not activated), or a flag "DONT" when the reference rule is invalidated.

The "instance name" and "slot name" slots of each instance are provided for specifying one of the instances of the "active value" class and a slot (i.e., referenced slot) thereof, respectively. The "instance name" slot stores therein the name of one of the instances of the "active value" class having it as a slot value, while the "slot name" slot stores therein the name of a slot having the slot value in question. In FIG. 13, for example, the instance 51a (instance AV1) has the "instance name" slot having a value "Tanaka" and the "slot name" slot having a value "saving", set therein. This means that the "saving" slot (refer to FIG. 9) of the "Tanaka" instance has the instance 51a (instance AV1) as a slot value. The same also holds true for the instances 52a to 56a (instances AV2 to AV6).

Even in the second embodiment, such dependency between the referenced and reference slots as explained in the foregoing first embodiment is satisfied.

Figure 14:
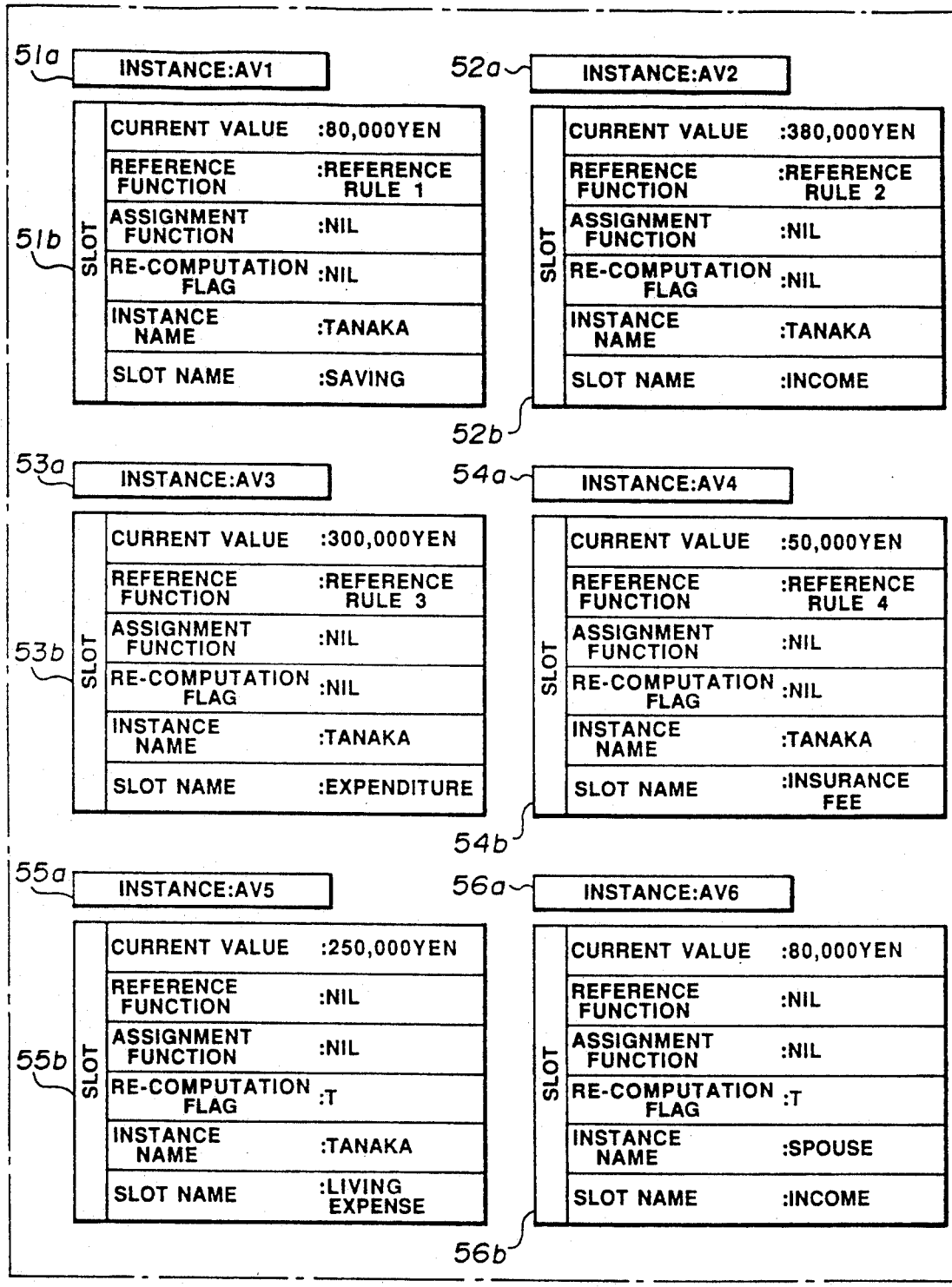
Figure 15:
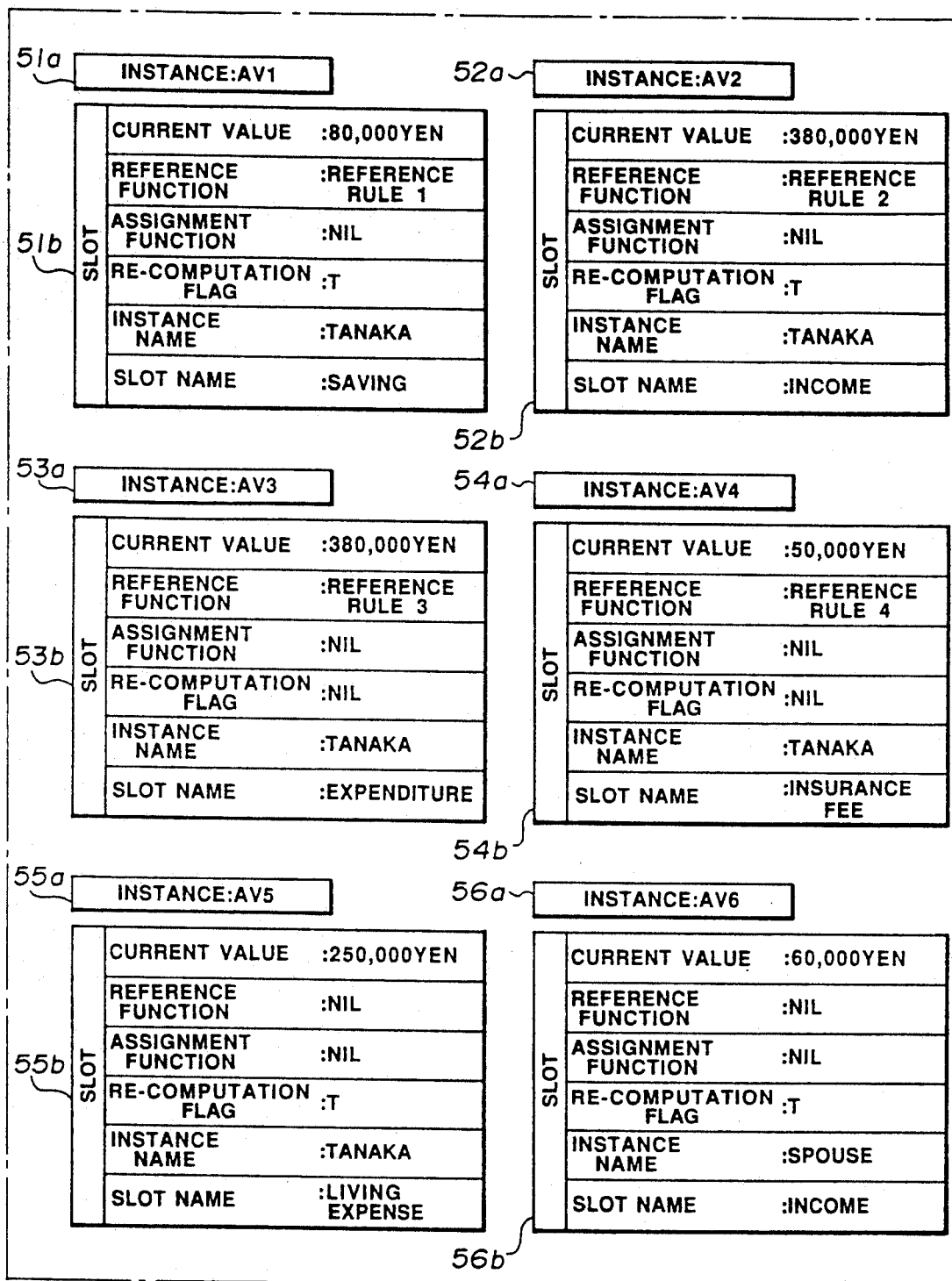
Figure 16:
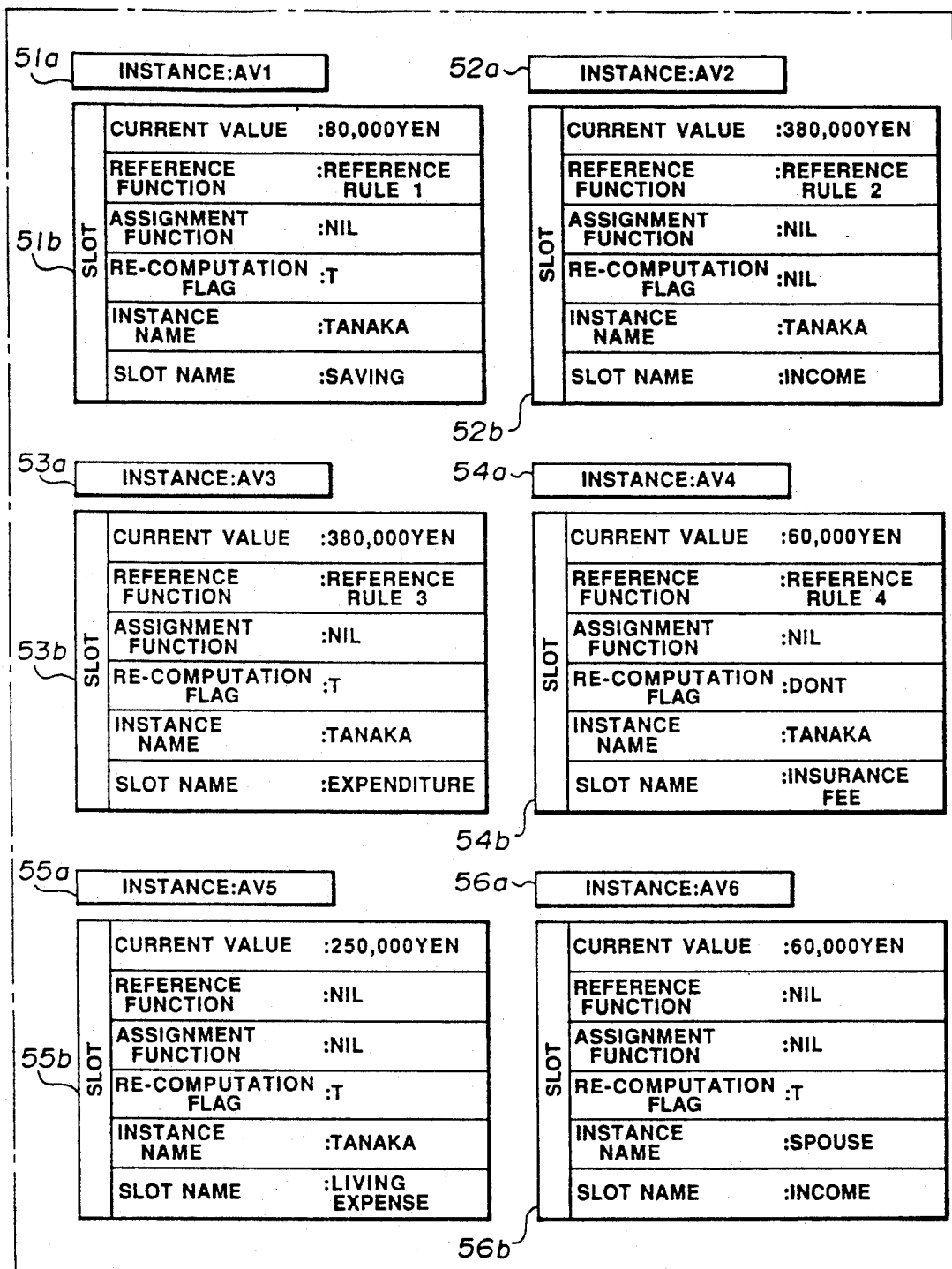
Figure 17:
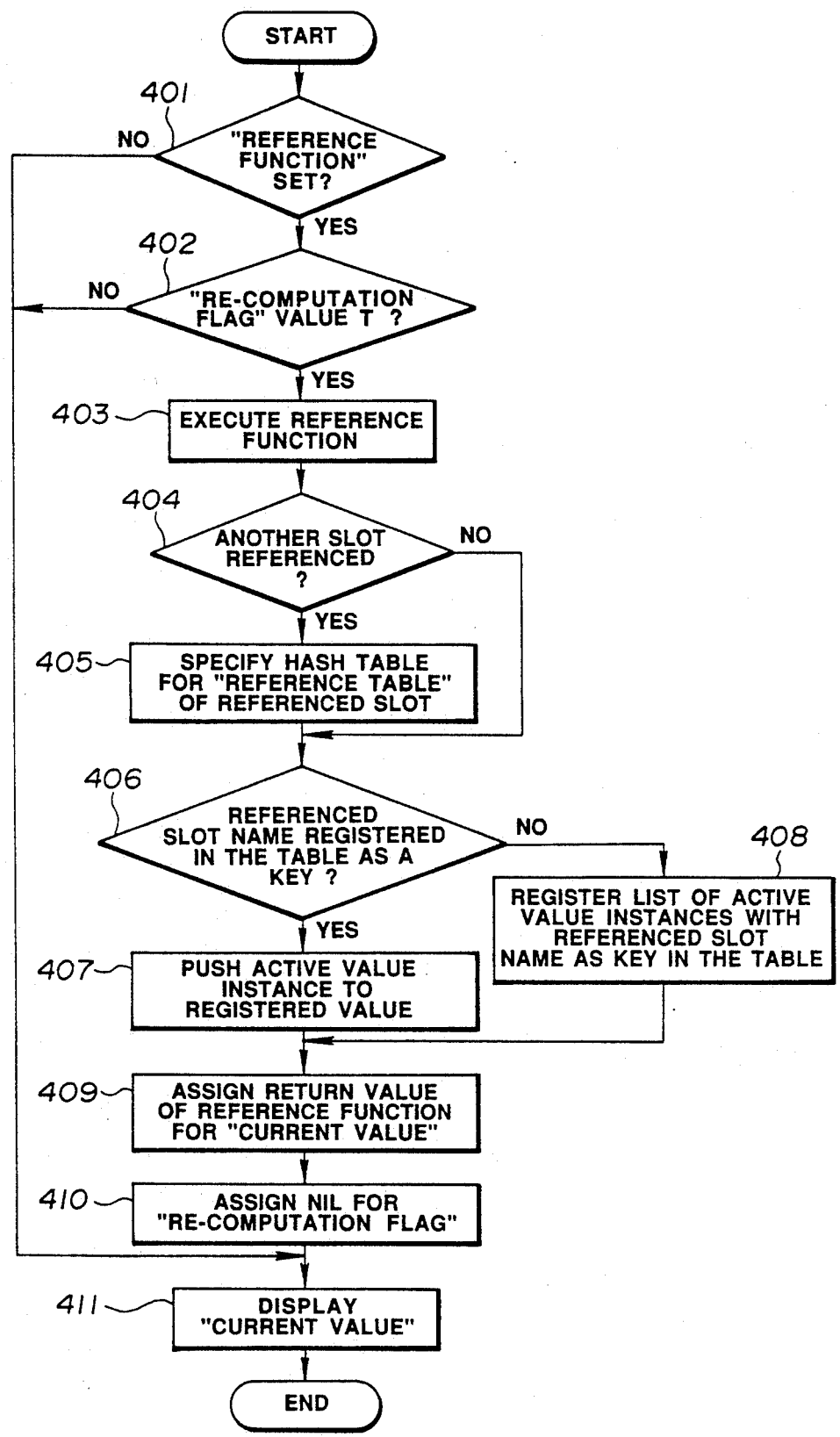
FIG. 17 is a flowchart for explaining the referencing operation of a slot value in the second embodiment.
Figure 18A:
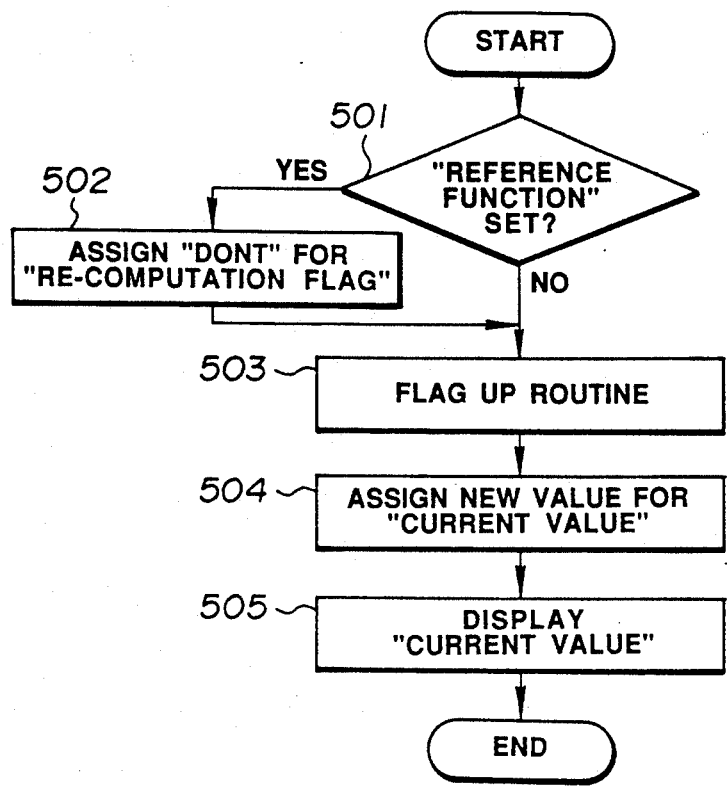
FIGS. 18(a) and 18(b) are a flowchart for explaining the assigning operation of a slot value in the second embodiment.
Figure 18B:
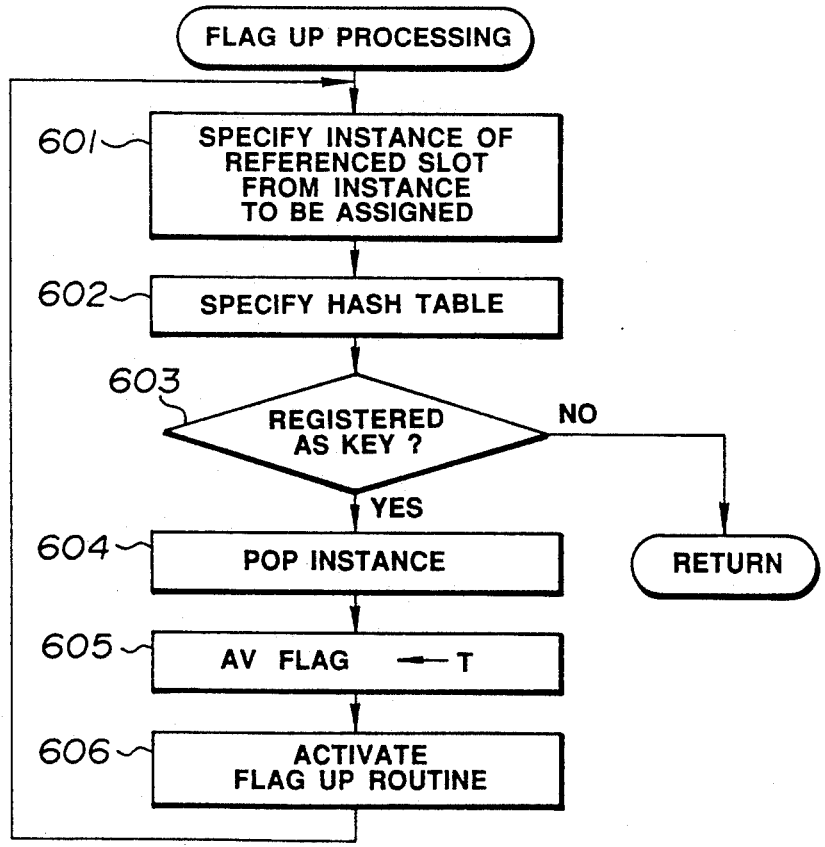

With the aforementioned arrangement, the slot accessing operation of the processor 20 will be explained by referring to FIGS. 14 to 18. More specifically, FIG. 14 to 16 show the contents of the instances of the "active value" class for explaining the referencing operation of the slot value. FIG. 17 is a flowchart for explaining the referencing operation to the slot value, FIG. 18(a) is a main routine for explaining the assigning operation of the slot value, and FIG. 18(b) is a sub-routine for explaining the assigning operation.

As shown in FIG. 17, the processor 20 examines whether or not a reference function (reference rule) is set in the "reference function" slot of an instance to be referenced (step 401). When determining the reference function (reference rule) is set in the "reference function" slot, the processor 20 judges whether or not the "re-computation flag" slot has a value of "T" (step 402). If the "re-computation flag" slot has a value of "T", then the processor 20 executes the reference function set in the "reference function" slot (step 403) and after completing the execution, judges whether or not reference was made to a slot of another instance (step 404). If so, then the processor 20 specifies the hash table in the "reference table" of referenced slot (the other instance) (step 405).

When the step 405 is completed or when no reference is determined to be made to the other slot in the step 404, the processor 20 judges whether or not the referenced slot name is already registered in the corresponding hash table (step 406). If the registration is determined, the processor 20 pushes the instance of the "active value" class to the registered value (step 407); whereas if no registration is determined, the processor 20 registers in the hash table a list of the instances of the "active value" class with use of the referenced slot name as a key (step 408).

After completion of the step 407 or 408, the processor 20 assigns the return value of the reference function set in the instance to be referenced for the "current value" slot (step 409), assigns a value "NIL" for the "re-computation flag" slot (step 410), and further displays the value of the "current value" slot (step 411). When determining that no reference function is set in the "reference function" slot in the step 401 or when determining that the value of the "re-computation flag" slot is not "T" in the step 402 (that is, in the case of the "NIL" or "DONT"), the processor 20 proceeds to the step 411.

Explanation will next be made as to the assigning operation of the processor 20 for the slot value. As shown in FIG. 18(a), the processor 20 first checks whether or not a reference function (reference rule) is set in the "reference function" slot of an instance to be assigned (step 501). When determining that the reference function is set, the processor 20 assigns a value "DONT" for the "re-computation flag" (step 502). After completion of the step 502 or when determining in the step 501 that no reference function is set, the processor 20 invokes and executes the "flag up" routine (step 503).

After invoking the "flag up" routine, the processor 20 specifies the instance of the referenced slot based on the instance to be assigned as shown in FIG. 18(b) (step 601). Then the processor 20 specifies a hash table in the "reference table" slot of the specified instance (step 602) and examines whether or not the referenced slot name is registered as a key in the specified hash table (step 603).

If determining that the referenced slot name is registered, then the processor 20 pops one of the instances of the "active value" class on the basis of the registered value (step 604) and changes the "re-computation flag" slot of the popped instance from "NIL" to "T" (step 605). And the processor 20 activates the "flag up" routine to return to the step 601 and carry out the processing of the steps 601 to 605 (step 606). When determining that the referenced slot name is not registered as a key, the processor 20 returns to the main routine. This results in that, as shown in FIG. 18(a), the processor 20 assigns a new value for the "current value" slot of the instance to be assigned (step 504) and displays the value (step 505).

Explanation will then be made as to the initial referencing operation of the slot value of the "Tanaka" instance 31a of FIG. 9. In this case, the slots of the instances of the "active value" class has such values as shown in FIG. 13. More specifically, the "re-computation flag" slots of the instances 51a to 56a (instances AV1 to AV6) have respectively a value of "T" set therein, while the "reference function" slots of the instances 51a to 54a (instances AV1 to AV4) have different reference rules set therein respectively. Accordingly, when the "saving" slot 41 of the "Tanaka" instance 31a of FIG. 9 is initially referenced, since the "re-computation flag" slot has a value of "T" in FIG. 13, the reference rule 1 is invoked as the reference function of the instance 51a (instance AV1). Further according to the reference rule 1, the reference rules 2 and 3 are invoked as the reference functions of the instances 52a and 53a (instances AV2 and AV3). According to the reference rule 3, the reference rule 4 is invoked as the reference function of the instance 54a (instance AV4). This causes the instances of the "active value" class to be referenced so that, when the reference rules 1 to 4 are invoked and executed, the contents of the instances of the "active value" class are changed from the contents of FIG. 13 to those of FIG. 14.

Explanation will next be made as to the assigning operation to change the value of the "income" slot 46 of the "spouse" instance 32a of FIG. 10 from "80,000Yen" to "60,000Yen" when the slots of the instances of the "active value" class have such values as shown in FIG. 14, by referring again to FIGS. 18(a) and 18(b). In this case, the instance 56a (instance AV6) is first invoked in FIG. 14. Since no reference function is set in the "reference function" slot of the instance 56a (instance AV6) as shown in FIG. 14, the "flag up" routine is invoked and executed (refer to the steps 501 and 503 in FIG. 18(a)). In the "flag up" operation, the instance spouse (refer to FIG. 14) is specified as the instance of the referenced slot, based on the value registered in the "instance name" slot, while the hash table is specified based on the "reference table" slot 72 of the instance spouse (refer to the steps 601 and 602).

If it is assumed that the specified hash table has such contents as shown in FIG. 12, then the processor 20 examines whether or not the slot name "income" registered in the "slot name" slot is registered as a key in the hash table 82 (refer to the step 603 in FIG. 18(b)). In this case, since a list "($AV2)" is registered in the slot name "income" key of the hash table 82, the corresponding instance 52a (instance AV2) is popped and the value of the "re-computation flag" slot of the instance 52a (instance AV2) is changed from "NIL" to "T" (refer to the steps 604 and 605 in FIG. 18(a)).

Then the "flag up" routine is activated to perform substantially the same processing as the steps 601 to 605 even with respect to the instance 52a (instance AV2) (refer to the step 606 in FIG. 18(b)). Since the slots of the instance 52a (instance AV2) has such values as shown in FIG. 14, in the "flag up" operation of the instance 52a (instance AV2), the "Tanaka" instance 31a (refer to FIG. 14) is first specified an instance including the referenced slot and the hash table of the "Tanaka" instance 31a is specified as the hash table.

Assume now that the specified hash table has such contents as shown in FIG. 11. Then according to the hash table 81, a list "($AV1)" corresponding to the slot name "income", i.e., the instance 51a (instance AV1) is popped and then the value of the "re-computation flag" slot of the instance 51a (instance AV1) is changed from "NIL" to "T" (refer to the steps 604 and 605 in FIG. 18(b)). Even with respect to the instance 51a (instance AV1), the "flag up" routine is activated to carry out substantially the same processing as the steps 601 to 605 (refer to steps 601 to 606 in FIG. 18(b).

In this case, during the "flag up" operation of the instance 51a (instance AV1), the hash table 81 (refer to FIG. 11) of the "Tanaka" instance 31a is specified as the hash table. (At this point, the slot name "income" and the active value list "($AV1)" corresponding thereto is already deleted from the hash table.) However, at this point, since the slot name "saving" is not registered as a key in the table 81, control is returned to the main routine. This causes a value 60,000Yen to be assigned for the "current value" slot of the instance 56a (instance AV6) and to be displayed.

Shown in FIG. 15 are the contents of the slots of the instances belonging to the "active value" class after a value is assigned for the "current value" slot of the instance 56a (instance AV6).

Explanation will be made as to the referencing operation to the slot 41 ("saving" slot) of the "Tanaka" instance 31a of FIG. 9 when the slots of the instances have such values as shown in FIG. 15, by referring again to FIG. 17. In this case, reference is first made to the instance 51a (instance AV1) in FIG. 15. Since the reference rule 1 is set in the "reference function" slot of the instance 51a (instance AV1) as a reference function and the "re-computation flag" slot has value of "T" as shown in FIG. 15, the reference rule 1 is invoked and executed (refer to the steps 401 to 403 in FIG. 17). The execution of the reference rule 1 causes the instances 52a and 53a (instances AV2 and AV3) to be referenced. At this time, the instances 52a and 53a (instances AV2 and AV3) are subjected to the execution of processing of the steps 401 to 411 of FIG. 17. An instance-referenced result is returned to the instance 51a (instance AV1).

The instance 51a (instance AV1) references the slots of the instances 52a and 53a (instances AV2 and AV3) and specifies that the both uses the hash table 81 (refer to FIG. 11) of the "Tanaka" instance 31a (refer to the steps 404 and 405 in FIG. 17). In the hash table 81 upon this specifying operation, the slot name "income" is popped at the time of assigning for the "income" slot 46 of the above "spouse" instance 32a. That is, the slot name "income" of the instance 52a (instance AV2) is not registered as a key in the hash table 81. For this reason, the slot name "income" and the list "($AV1)" of the activity value instance are registered in the hash table 81. Since the slot name "expenditure" of the instance 53a (instance AV3) is registered as a key in the hash table 81 at the specified time point, the list "($AV1)" corresponding to the key is pushed (refer to the steps 406 to 408 in FIG. 17).

The execution of the reference function (reference rule 1) causes the instances 52a and 53a (instances AV2 and AV3) to be referenced while the referencing operation of the instance 52a (instance AV2) causes the "re-computation flag" slot to have a value of "T" as mentioned above, which results in that the reference rule 2 is invoked and executed as the reference function. And the value "360,000Yen" of the "current value" slot is returned to the "saving" slot 41 of the "Tanaka" instance 31a as the return value of the reference function. Since the "re-computation flag" slot has a value of "NIL" in referencing the instance 53a (instance AV3), no re-computation for the slot value is not carried out and the value "300,000Yen" of the "current value" slot of the instance 53a (instance AV3) is returned to the "saving" slot 41 of the "Tanaka" instance 31a.

After completion of the execution of the reference function, the return value "60,000Yen" (i.e., saving = income minus expenditure = 360,000Yen − 300,000Yen) is assigned for the "current value" slot of the instance 51a (instance AV1), a value "NIL" is assigned for the "re-computation flag" slot and then the value "60,000Yen" of the "current value" slot is displayed (refer to the steps 409 to 411 in FIG. 17).

As has been explained in the foregoing, even when the reference rule 1 of the instance 51a (instance AV1) is invoked and executed, the value "60,000Yen" of the "current value" slot of the instance AV1 can be found without again calculating the "current value" slot of the instance 53a (instance AV3) only by again calculating the value "360,000Yen" of the "current value" of the instance 52a (instance AV2).

Explanation will next be made as to the assigning operation when a value "60,000Yen" is assigned for the "insurance fee" slot 44 of the "Tanaka" instance 31a of FIG. 9 under condition that the slots of the instances of the "active value" class have such values as shown in FIG. 14, by referring again to FIGS. 18(a) and 18(b). In this case, the instance 54a (instance AV4) to be assigned is invoked in FIG. 14. Further, the hash table of the "Tanaka" instance 31a has such contents as shown in FIG. 11. The instance 54a (instance AV4) is first invoked in FIG. 14. Since the reference function (reference rule 4) is set in the "reference function" slot of the instance 54a (instance AV4) as shown in FIG. 14, a value "DONT" is assigned for the "re-computation flag" slot and then the "flag up" routine is invoked and executed (refer to the steps 501 to 503 in FIG. 18(a)).

In the "flag up" operation of the instance 54a (instance AV4), the "Tanaka" instance 31a (refer to FIG. 14) is specified as an instance including the referenced slot and the hash table 81 (refer to FIG. 11) of the instance "Tanaka" instances 31a is specified. Since a list "($AV3)" or the instance 53a (instance AV3) is registered as a key in the slot name "insurance fee" of the specified hash table 81, a value "T" is assigned for the "re-computation flag" slot of the instance 53a (instance AV3). Further, the "flag up" routine is activated to subject the instance 53a (instance AV3) to the execution of processing of the steps 601 to 605 (refer to the steps 601 to 606 in FIG. 18(b)).

In the "flag up" operation of the instance 53a (instance AV3), the "Tanaka" instance 31a and the hash table 81 are specified. Since a list "($AV1)" or the instance 51a (instance AV1) is registered as a key in the slot name "expenditure" of the hash table 81 (refer to FIG. 11), a value "T" is assigned for the "re-computation flag" slot of the instance 51a (instance AV1). The "flag up" routine is activated to subject the instance 51a (instance AV1) to the execution of processing of the steps 601 to 605 (refer to the steps 601 to 606 in FIG. 18(b)).

In the "flag up" operation of the instance 51a (instance AV1), the "Tanaka" instance 31a and the hash table 81 are specified. However, since the slot name "saving" and an instance as its key are not registered in the hash table 81 (refer to FIG. 11),control is returned to the main routine (refer to the steps 601 to 603 in FIG. 18(b)). This causes a new value "60,000Yen" to be assigned for the "current value" slot of the instance 53a (instance AV3) and be displayed (refer to the steps 504 and 505 in FIG. 18(a)).

FIG. 16 shows the contents of the slots of the instances belonging to the "active value" class after a value "60,000Yen" is assigned for the "insurance fee" slot of the "Tanaka" instance.

Explanation will be made as to the referencing operation to the value of the "expenditure" slot 43 (refer to FIG. 9) of the "Tanaka" instance 31a when the slots of the instances have such values as shown in FIG. 16, by referring again to FIG. 17.

In this case, reference is made first to the instance 53a (instance AV3) in FIG. 16. Since the reference rule 3 is set as the reference function in the "reference function" slot of the instance 53a (instance AV3) and the "re-computation flag" slot has a value of "T" as shown in FIG. 16, the reference rule 3 in invoked and executed (refer to the steps 401 to 403 in FIG. 17).

The execution of the reference rule 3 causes the instances 54a and 55a (instances AV4 and AV5) to be referenced. At this time, even the instances 54a and 55a (instances AV4 and AV5) are subjected to the execution of processing of the steps 401 to 411 in FIG. 17. An instance execution result is returned to the instance 51a (instance AV1).

Since the "re-computation flag" slot of this instance has a value of "DONT" in the referencing operation of the instance 54a (instance AV4), the reference rule 4 is not invoked as the reference function and the value "60,000Yen" of the "current value" slot is returned to the "expenditure" slot 43a of the "Tanaka" instance 31a. Since the "reference function" slot of this instance has a value of "NIL" in the referencing operation of the instance 54a (instance AV5), the value "250,000Yen" of the "current value" slot is returned to the "expenditure" slot 43a of the "Tanaka" instance 31a.

After completion of the execution of the reference function, the return value of the reference function (reference rule 3) (expanditure=living expense plus insurance fee=250,000Yen+60,000Yen="310,000Yen") is assigned for the "current value" slot of the instance 53a (instance AV3), a value "NIL" is assigned for the "re-computation flag" slot, and then the value "310,000Yen" of the "current value" slot is displayed (refer to the steps 409 to 411 in FIG. 17). Following the completion of the above reference rule (after the completion of the step 403), substantially the same operation (steps 404 to 408) as the second-time referencing operation of the "saving" slot 41 of the "Tanaka" instance 31a is carried out.

As has been described in the foregoing, even when the reference rule 3 is invoked and executed, since the "re-computation flag" slot of the instance 54a (instance AV4) has a value of "DONT", no reference function is invoked and the "saving" slot 44 of the instance 31a causes the value "60,000Yen" of the "current value" slot to be returned to the "expenditure" slot 43 of the instance 31a, so that the "expenditure" slot 43 has a value of "310,000Yen".

As has been disclosed in the foregoing, in accordance with the second embodiment, the "re-computation flag", "instance name" and "slot name" slots are added, to the slots of the object (class) having the reference rules and it is judged whether or not re-computation is carried out for the value of the slots of the object having the reference rules, so that the re-computation is carried out only when data (e.g., "T") indicative of the re-computation is set in the "re-computation flag" slot, whereby the referencing operation of the slot value can be made fast.

Further, the reference rule is made invalid (the value "DONT" is set in the "re-computation flag" slot) in the assigning operation of a value to the slot of the object (class) having the reference rule, so that, in the next-time referencing operation of the slot value of the object (class), the re-computation of the slot value can be made unnecessary, whereby the referencing operation can be made fast.

As has been disclosed in the foregoing, in accordance with the present invention, when the slot of the object having the reference rule is desired to be referenced, the re-computation of the slot value is carried out on the basis of data indicative of whether or not to re-compute the slot value. As a result, even in the event where a reference rule is set in an object to be referenced, when data indicative of unnecessary re-computation of the slot value is set, the re-computation can be made unnecessary and the referencing operation of the slot value can be made fast. Therefore, since the accessing speed to the slot can be made high, inference to a problem object can be made fast.

The present invention can be carried out in various ways without departing from the spirit and major features thereof. Thus, it should be appreciated that the foregoing embodiments are explained merely as examples in every respect and the invention is not limited to the specific examples. In other words, the present invention is restricted not by the disclosed body of the specification but by the scope of the attached claims. Thus, it should be understood that the present invention covers all modifications and equivalent arrangements included in the scope of the appended claims.

What is claimed is:

1. A method of accessing a slot in an object-oriented expert system having a class structure of a modeled problem object, an active value class associated with said class structure, and an inference rule for application, while preparing a first instance of a class of the class structure, the first instance having value as a slot value for association with a second instance of said active valve class, wherein, the slot of said second instance include:
a current value,
a reference rule for specifying a third instance belonging to the active value class for use in calculating a current value, and for calculating said current value on the basis of the slot of said third instance,
re-computation data indicative of the validity of said current value; and
destination data indicative of a destination to which an effect that the current value becomes invalid and wherein, the processing executed by said third instance which is being referenced from a slot of another instance comprises the steps of:
recognizing if said re-computation data of the slot of said third instance indicates invalidity, a fourth instance which is referenced and obtained in accordance with the reference rule of the slot said third instance, and updating the current value on the basis of a content of the slot of said fourth instance;
changing said re-computation data indicative of invalidity to the re-computation data indicative of validity;
describing a value, as the destination data of the slot of said fourth instance which is referenced according to the reference rule of the slot of said third instance a said value relating said third instance to said fourth instance which is reference; and
notifying, by referring to a content of the destination data of the slot of the third instance, an instance having said content of the destination data of the slot of said third instance that the current value is updated, when the current value of the slot of said third instance is updated.

2. The method as set forth in claim 1 further including the step of adding data to said first instance said data indicative of a corresponding relationship between a slot of said first instance and said third instance is to be associated with the slot and which belongs to the active value class.

3. The method as set forth in claim 1, wherein said data comprises a table in which a slot name of a slot of the first instance and said second instance are associated.

4. An object-oriented expert system having memory means for storing a class structure of a modeled problem object, an active value class associated with said class structure, an inference rule and inference means for carrying out an inference according to said inference rule while preparing a first instance of a class of the class structure, the first instance having a slot value which associates with a second instance of the active value class, wherein a slot for each said second instance belonging to the active value class whereby said slot includes:
a current value;
a reference rule for recognizing a second instance and which is to be referenced when calculating the current value, and for calculating the current value on the basis of the slot of the recognized instance;
re-computation data indicative of the validity status and invalidity status of the current value; and
destination data indicative of a destination to which an effect that the current value has invalidity status, and wherein said second instance referenced from a slot another instance comprises:
updating means for recognizing if said re-computation data of the slot of the instance being referenced indicates an invalidity status in the recognized instance, referenced and obtained in accordance with the reference rule of the slot of said second instance and updating the current value on the basis of contents of the slot of said recognized instance;
changing means for changing the re-computation data to indicate that the current value of the slot of said third instance has valid status when the current value is updated by said updating means;
describing means for describing a value which associates with said third instance into the destination data of the slot of said fourth instance to be referenced according to the reference rule of the slot of said third instance being referenced; and
notifying means for notifying, by referring to a value of the destination data of the slot of said third instance being referenced an instance having the value of the destination data that the current value is updated, when the current value of the slot of said third instance is updated.

5. An object-oriented expert system including memory means for storing a class structure of a modeled problem object, an active value class associated with the class structure, an inference rule and inference means for carrying out the inference according to the inference rule while preparing a first instance of a class of the class structure, said first instance having a value as a slot value associated with a second instance of the active value class, wherein the memory means stores, in a slot of each said second instance belonging to the active value close, each of a current value, a reference rule for recognizing the instance which belongs to the active value class, said reference rule being referenced when calculating said current value and, said reference rule being used for calculating said current value on the basis of a slot of the recognized instance, re-computation data indicative of the validity or invalidity of said current value, and destination data indicative of a destination for an invalid current value and wherein the inference means comprises:
specifying means for specifying a third instance associated with a value of the slot of the instance belonging to the class of the class structure of the modeled problem object from second instances belonging to the active value class stored in the memory means, when the slot of a first instance is referenced;
updating means for recognizing, if the re-computation data of the slot of the third instance indicates invalidity, a fourth instance to be referenced according to the reference rule of the slot of the specified instance, and updating the current value on the basis of contents of the slot of the fourth instance;

changing means for changing the re-computation data of the slot of the third instance to indicate that the re-computation data is valid;

describing means for describing a value which associates with the third instance into the destination data of the slot of the fourth instance; and notifying means for notifying a fifth instance corresponding to a content of the destination data that the current value is updated, when the current value of the slot of the third instance is updated by referring to the content of the destination data of the slot of the third instance.

* * * * *